US010903985B2

(12) United States Patent
Bergeron (10) Patent No.: US 10,903,985 B2
(45) Date of Patent: Jan. 26, 2021

(54) MONITORING ENCRYPTED NETWORK TRAFFIC FLOWS IN A VIRTUAL ENVIRONMENT USING DYNAMIC SESSION KEY ACQUISITION TECHNIQUES

(71) Applicant: Keysight Technologies Singapore (Sales) Pte. Ltd, Singapore (SG)

(72) Inventor: Matthew R. Bergeron, Thousand Oaks, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 108 days.

(21) Appl. No.: 16/113,360

(22) Filed: Aug. 27, 2018

(65) Prior Publication Data

US 2020/0067700 A1 Feb. 27, 2020

Related U.S. Application Data

(60) Provisional application No. 62/550,558, filed on Aug. 25, 2017.

(51) Int. Cl.
*H04L 9/08* (2006.01)
*G06F 9/455* (2018.01)
(Continued)

(52) U.S. Cl.
CPC ........ *H04L 9/0819* (2013.01); *G06F 9/45558* (2013.01); *H04L 41/046* (2013.01);
(Continued)

(58) Field of Classification Search
CPC . H04L 63/0464; H04L 63/08; H04L 63/1408; H04L 63/06; H04L 63/14;
(Continued)

(56) References Cited

U.S. PATENT DOCUMENTS

| 5,557,678 A | 9/1996 | Ganesan |
| 6,330,671 B1 | 12/2001 | Aziz |

(Continued)

FOREIGN PATENT DOCUMENTS

| EP | 3528430 A1 | 8/2019 |
| WO | 2016176070 A1 | 11/2016 |

OTHER PUBLICATIONS

Commonly-assigned, co-pending U.S. Appl. No. 15/980,699 for "Methods, Systems, and Computer Readable Media for Monitoring Encrypted Network Traffic Flows," (Unpublished, filed May 15, 2018).

(Continued)

*Primary Examiner* — Kristine L Kincaid
*Assistant Examiner* — Shaqueal D Wade (57) ABSTRACT

A method executed by a dynamic session key acquisition (DSKA) engine residing in a virtual environment includes receiving session decryption information extraction instructions that configure the DSKA engine to obtain session decryption information for at least one communication session involving a virtual machine and obtaining the session decryption information from the virtual machine in accordance with the session decryption information extraction instructions. The session decryption information includes cryptographic keys utilized by an application server instance in the virtual machine to establish the at least one communication session. The session decryption information obtained from the virtual machine is stored and provided to a network traffic monitoring (NTM) agent. The NTM agent utilizes the session decryption information to decrypt copies of encrypted network traffic flows belonging to the at least one communication session involving the virtual machine.

20 Claims, 3 Drawing Sheets

(51) Int. Cl.
*H04L 29/06* (2006.01)
*H04L 12/24* (2006.01)
*H04L 12/26* (2006.01)

(52) U.S. Cl.
CPC .......... *H04L 43/08* (2013.01); *H04L 63/0485* (2013.01); *G06F 2009/45587* (2013.01); *G06F 2009/45595* (2013.01)

(58) Field of Classification Search
CPC ... H04L 63/0485; H04L 43/12; H04L 43/062; H04L 9/0819; H04L 9/083; G06F 9/4558
See application file for complete search history.

(56) References Cited

U.S. PATENT DOCUMENTS

| | | |
|---|---|---|
| 6,480,488 B1 | 11/2002 | Huang |
| 6,684,331 B1 | 1/2004 | Srivastava |
| 7,340,744 B2 | 3/2008 | Chandwadkar et al. |
| 7,363,353 B2 | 4/2008 | Ganesan et al. |
| 7,373,412 B2 | 5/2008 | Colas et al. |
| 7,421,506 B2 | 9/2008 | Ni et al. |
| 7,562,213 B1 | 7/2009 | Timms |
| 7,634,650 B1 | 12/2009 | Shah et al. |
| 7,778,194 B1 | 8/2010 | Yung |
| 7,971,240 B2 | 6/2011 | Guo et al. |
| 8,270,942 B2 | 9/2012 | Zabawskyj et al. |
| 8,457,126 B2 | 6/2013 | Breslin et al. |
| 8,514,756 B1 | 8/2013 | Ramachandra et al. |
| 8,566,247 B1 | 10/2013 | Nagel et al. |
| 8,595,835 B2 | 11/2013 | Kolton et al. |
| 8,601,152 B1 | 12/2013 | Chou |
| 8,654,974 B2 | 2/2014 | Anderson et al. |
| 8,788,805 B2 | 7/2014 | Herne et al. |
| 8,881,282 B1 | 11/2014 | Aziz et al. |
| 8,929,356 B2 | 1/2015 | Pandey et al. |
| 8,938,611 B1 | 1/2015 | Zhu et al. |
| 8,953,439 B1 | 2/2015 | Lin et al. |
| 9,065,642 B2 | 6/2015 | Zaverucha et al. |
| 9,298,560 B2 | 3/2016 | Janakiraman et al. |
| 9,380,002 B2 | 6/2016 | Johansson et al. |
| 9,392,010 B2 | 7/2016 | Friedman et al. |
| 9,407,643 B1 | 8/2016 | Bavington |
| 9,565,202 B1 | 2/2017 | Kindlund et al. |
| 9,660,913 B2 | 5/2017 | Newton |
| 9,673,984 B2 | 6/2017 | Jiang et al. |
| 9,680,869 B2 | 6/2017 | Buruganahalli et al. |
| 9,800,560 B1* | 10/2017 | Guo .................... H04L 63/0435 |
| 9,807,121 B1 | 10/2017 | Levy et al. |
| 9,882,929 B1 | 1/2018 | Ettema et al. |
| 9,893,883 B1 | 2/2018 | Chaubey et al. |
| 9,906,401 B1 | 2/2018 | Rao |
| 10,063,591 B1 | 8/2018 | Jiang et al. |
| 10,079,810 B1 | 9/2018 | Moore et al. |
| 10,079,843 B2 | 9/2018 | Friedman et al. |
| 10,291,651 B1 | 5/2019 | Chaubey |
| 10,326,741 B2 | 6/2019 | Rothstein et al. |
| 10,404,597 B2 | 9/2019 | Bakshi |
| 10,419,965 B1 | 9/2019 | Kadosh et al. |
| 10,482,239 B1 | 11/2019 | Liu et al. |
| 10,516,532 B2 | 12/2019 | Taub et al. |
| 2002/0116485 A1 | 8/2002 | Black et al. |
| 2003/0004688 A1 | 1/2003 | Gupta et al. |
| 2004/0083362 A1 | 4/2004 | Park et al. |
| 2004/0168050 A1 | 8/2004 | Desrochers et al. |
| 2005/0050362 A1 | 3/2005 | Peles |
| 2005/0111437 A1 | 5/2005 | Maturi |
| 2005/0160269 A1 | 7/2005 | Akimoto |
| 2006/0085862 A1 | 4/2006 | Witt et al. |
| 2006/0259579 A1 | 11/2006 | Beverly |
| 2007/0022284 A1 | 1/2007 | Vishwanathan |
| 2007/0033408 A1 | 2/2007 | Morten |
| 2007/0078929 A1 | 4/2007 | Beverly |
| 2007/0169190 A1 | 7/2007 | Kolton et al. |
| 2008/0005782 A1 | 1/2008 | Aziz |
| 2008/0031141 A1 | 2/2008 | Lean et al. |
| 2008/0320297 A1 | 12/2008 | Sabo et al. |
| 2009/0150521 A1 | 6/2009 | Tripathi |
| 2009/0150527 A1 | 6/2009 | Tripathi et al. |
| 2009/0150883 A1 | 6/2009 | Tripathi et al. |
| 2009/0220080 A1 | 9/2009 | Herne et al. |
| 2009/0222567 A1 | 9/2009 | Tripathi et al. |
| 2009/0254990 A1 | 10/2009 | McGee |
| 2010/0250769 A1 | 9/2010 | Barreto et al. |
| 2011/0231659 A1 | 9/2011 | Sinha |
| 2011/0286461 A1 | 11/2011 | Ichino et al. |
| 2011/0289311 A1 | 11/2011 | Roy-Chowdhury et al. |
| 2012/0082073 A1 | 4/2012 | Andreasen et al. |
| 2012/0137289 A1 | 5/2012 | Nolterieke et al. |
| 2012/0210318 A1* | 8/2012 | Sanghvi .................. H04L 49/70 718/1 |
| 2012/0236823 A1 | 9/2012 | Kompella et al. |
| 2012/0304244 A1 | 11/2012 | Xie et al. |
| 2013/0054761 A1 | 2/2013 | Kempf et al. |
| 2013/0117847 A1 | 5/2013 | Friedman et al. |
| 2013/0239119 A1 | 9/2013 | Garg et al. |
| 2013/0265883 A1 | 10/2013 | Henry et al. |
| 2013/0272136 A1 | 10/2013 | Ali et al. |
| 2014/0010083 A1 | 1/2014 | Hamdi et al. |
| 2014/0082348 A1 | 3/2014 | Chandrasekaran et al. |
| 2014/0115702 A1 | 4/2014 | Li et al. |
| 2014/0189093 A1 | 7/2014 | Du Toit et al. |
| 2014/0189861 A1 | 7/2014 | Gupta et al. |
| 2014/0189961 A1 | 7/2014 | He et al. |
| 2014/0226820 A1 | 8/2014 | Chopra et al. |
| 2014/0351573 A1 | 11/2014 | Martini |
| 2015/0026313 A1 | 1/2015 | Chawla et al. |
| 2015/0039889 A1 | 2/2015 | Andoni |
| 2015/0052345 A1 | 2/2015 | Martini |
| 2015/0113264 A1 | 4/2015 | Wang et al. |
| 2015/0124622 A1 | 5/2015 | Kovvali et al. |
| 2015/0172219 A1 | 6/2015 | Johansson et al. |
| 2015/0264083 A1 | 9/2015 | Prenger et al. |
| 2015/0281954 A1 | 10/2015 | Warren |
| 2015/0288679 A1 | 10/2015 | Ben-Nun et al. |
| 2015/0295780 A1 | 10/2015 | Hsiao et al. |
| 2015/0341212 A1 | 11/2015 | Hsiao et al. |
| 2016/0014016 A1 | 1/2016 | Guichard et al. |
| 2016/0080502 A1 | 3/2016 | Yadav et al. |
| 2016/0105469 A1 | 4/2016 | Galloway et al. |
| 2016/0105814 A1 | 4/2016 | Hurst et al. |
| 2016/0119374 A1 | 4/2016 | Williams et al. |
| 2016/0127517 A1 | 5/2016 | Shcherbakov et al. |
| 2016/0142440 A1 | 5/2016 | Qian et al. |
| 2016/0248685 A1 | 8/2016 | Pignataro et al. |
| 2016/0277321 A1 | 9/2016 | Johansson et al. |
| 2016/0277971 A1 | 9/2016 | Hamdi et al. |
| 2016/0294784 A1 | 10/2016 | Hopkins et al. |
| 2016/0344754 A1 | 11/2016 | Rayapeta et al. |
| 2016/0373185 A1 | 12/2016 | Wentzloff et al. |
| 2017/0048328 A1 | 2/2017 | Korotaev et al. |
| 2017/0070531 A1 | 3/2017 | Huston et al. |
| 2017/0237719 A1 | 8/2017 | Schwartz et al. |
| 2017/0302554 A1 | 10/2017 | Chandrasekaran et al. |
| 2017/0339022 A1 | 11/2017 | Hegde et al. |
| 2017/0364794 A1 | 12/2017 | Mahkonen et al. |
| 2018/0006923 A1 | 1/2018 | Gao et al. |
| 2018/0091427 A1 | 3/2018 | Kumar et al. |
| 2018/0097787 A1 | 4/2018 | Murthy et al. |
| 2018/0097788 A1 | 4/2018 | Murthy |
| 2018/0097840 A1 | 4/2018 | Murthy |
| 2018/0124025 A1 | 5/2018 | Lam et al. |
| 2018/0176036 A1 | 6/2018 | Butcher et al. |
| 2018/0176192 A1 | 6/2018 | Davis et al. |
| 2018/0198838 A1 | 7/2018 | Murgia et al. |
| 2018/0234322 A1 | 8/2018 | Cohn et al. |
| 2018/0278419 A1 | 9/2018 | Higgins et al. |
| 2018/0331912 A1 | 11/2018 | Edmison et al. |
| 2018/0332078 A1* | 11/2018 | Kumar .................... G06F 21/33 |
| 2018/0351970 A1 | 12/2018 | Majumder et al. |
| 2018/0367422 A1 | 12/2018 | Raney et al. |
| 2019/0058714 A1 | 2/2019 | Joshi et al. |
| 2019/0068564 A1 | 2/2019 | Putatunda et al. |
| 2019/0116111 A1 | 4/2019 | Izard et al. |

(56) References Cited

U.S. PATENT DOCUMENTS

| | | | |
|---|---|---|---|
| 2019/0166049 A1 | 5/2019 | Bakshi | |
| 2019/0205244 A1 | 7/2019 | Smith | |
| 2019/0260794 A1 | 8/2019 | Woodford et al. | |
| 2019/0303385 A1 | 10/2019 | Ching et al. | |
| 2020/0053064 A1 | 2/2020 | Oprisan et al. | |
| 2020/0076773 A1 | 3/2020 | Monat et al. | |
| 2020/0104052 A1 | 4/2020 | Vijayan et al. | |
| 2020/0137021 A1 | 4/2020 | Janakiraman | |
| 2020/0137115 A1 | 4/2020 | Janakiraman et al. | |

OTHER PUBLICATIONS

Commonly-assigned, co-pending U.S. Appl. No. 15/608,369 for "Methods, Systems, and Computer Readable Media for Monitoring Encrypted Packet Flows Within a Virtual Network Environment," (Unpublished, filed May 30, 2017).
Non-Final Office Action for U.S. Appl. No. 15/608,369 (dated Mar. 7, 2019).
Commonly-assigned, co-pending U.S. Appl. No. 16/103,598 for "Methods, Systems, and Computer Reaadable Media for Implementing Bandwidth Limitations on Specific Application Traffic at a Proxy Element," (Unpublished, filed Aug. 14, 2018).
"Inspection of SSL Traffic Overview," Juniper Networks, pp. 1-4 (Jan. 19, 2011).
Non-Final Office Action for U.S. Appl. No. 15/980,699 (dated Dec. 9, 2019).
Non-Final Office Action for U.S. Appl. No. 15/608,369 (dated Oct. 31, 2019).
Advisory Action for U.S. Appl. No. 15/608,369 (dated Sep. 13, 2019).
Nubeva, "Nubeva TLS Decrypt: Out-of-Band Decrypted Visibility for the Cloud," www.nubeva.com/decryptioin, pp. 1-8 (Sep. 2019).
Nubeva, "What is Symmetric Key Intercep Architecture" https:www.nubeva.com/blog/what-is-symmetric-key-intercept-architecture, pp. 1-4 (Aug. 8, 2019).
Final Office Action for U.S. Appl. No. 15/608,369 (dated Jun. 27, 2019).
Notice of Allowance and Fee(s) Due for U.S. Appl. No. 15/826,787 (dated Apr. 25, 2019).
Non-Final Office Action for U.S. Appl. No. 15/826,787 (dated Jan. 3, 2019).
Solution Brief, "Smart Packet Brokening for Mobile Network Operators," Brocade, pp. 1 (Jul. 19, 2017).
Vavilapalli et al., Cord Design Notes, "Cord Monitoring Service," pp. 1-14 (Mar. 14, 2016).
ACG Research, "Business Case for Brocade Network Analytics for Mobile Network Operators," pp. 1-11 (2015).
Ixia Anue GTP Session Controller, Take Control of GTP Monitoring to Improve Customer QoE and Maximize Network ROI, Solution Brief, Document No. 915-6606-01 Rev. A, pp. 1-2 (Sep. 2013).
Ixia Network Visibility Solutions, Anue GTP Session Controller 7433, Product Specifications, Document No. 915-6504-010 Rev. B, pp. 1-3 (May 2013).
Schulist et al., "Linux Socket Filtering aka Berkeley Packet Filter (BPF)," Wayback Machine, https://www.kernel.org/doc/Documentation/networking/filter.txt, pp. 1-25 (Jun. 8, 2018).
Starovoitov, "[PATCH net-next 6/6] samples: bpf: large eBPF program in C," lkml.org, https://lkml.org/lkml/2014/11/27/10, pp. 1-5 (Nov. 26, 2014).
Andreyev, "Introducing data center fabric, the next-generation Facebook data center network," Data Center Engineering, Networking & Traffic, Production Engineering, https://code.fb.com/production-engineering/introducing-data-center-fabric-the-next-generation-facebook-data-center-network/, pp. 1-10 (Nov. 14, 2014).
Corbet, "Extending extende BPF," LWN.net, https://lwn.net/Articles/603983/, pp. 1-4 (Jul. 2014).
Corbet, "BPF: the universal in-kernel virtual machine," LWN.net, https://lwn.net/Articles/599755/, pp. 1-3 (May 2014).
Git, "Linux Kernel Source Tree," https://git.kernel.org/pub/scm/linux/kernel/git/torvalds/linux.git/tree/samples/bpf/sockex2_kern.c, pp. 1-4 (2018).
Final Office Action for U.S. Appl. No. 15/608,369 (dated Apr. 22, 2020).
Final Office Action for U.S. Appl. No. 15/980,699 (dated Apr. 20, 2020).
Commonly-assigned, co-pending U.S. Appl. No. 16/781,542 for "Methods, Systems, and Computer Readable Media for Processing Network Flow Metadata at a Network Packet Broker," (Unpublished, filed Feb. 4, 2020).
Stankovic, "How to solve duplicated NetFlow caused by multiple exporters," https://www.netvizura.com/blog/how-to-solve-duplicated-netflow-caused-by-multiple-exporters, pp. 1- 4 (Accessed Jan. 15, 2020).
"Jumbo Frame," Wikipedia, https://en.wikipedia.org/wiki/Jumbo_frame, pp. 1-4 (Jan. 15, 2020).
"How is the MTU is 65535 in UDP but ethernet does not allow frame size more that 1500 bytes," ServerFault, TCPIP, pp. 1-9 (Accessed Jan. 15, 2020).
"Network Monitoring Step 2: The Next-Generation of Packet Brokers," MantisNet, pp. 1-6 (2020).
"CPacket cVu 2440NG/3240NG," https://www.cpacket.com/resources/cvu-3240-2440-datasheet/, pp. 1-4 Accessed Jan. 15, 2020).
"What are Microservices," An Introduction to Microservices, https://opensource.com/resources/what-are-microservices, pp. 1-8 (Accessed Jan. 15, 2020).
"IPv6," Wikipedia, https://en.wikipedia.org/wiki/IPv6, pp. 1-15 (Jan. 8, 2020).
Paul, Santanu, "Network Visibility Component with Netflow Jumbo Frame Support," The IP.com Journal, pp. 1-8 (Aug. 2019).
Paul, Santanu, "Methods and Systems for Session-Aware Collection of Netflow Statistics," The IP.com Journal, pp. 1-5 (Jul. 2019).
Pandey, Sharedendu; Johansson, Stefan Jan, "Network Packet Broker with Flow Segmentation Capability," The IP.com Journal, pp. 1-6 (Jul. 2019).
Paul, Santanu, "Network Packet Broker with Flow Segmentation Capability," The IP.com Journal, pp. 1-6 (Aug. 2019).
Paul, Santanu, "Custom Key Performance Indicator (KPI) Network Visibility System," The IP.com Journal, pp. 1-4 (Jul. 2019).
Paul, Santanu, "Self-Healing Network Visibility System," The IP.com Journal, pp. 1-5 (Jun. 2019).
"About NetFlow," Watchguard Technologies, Inc., pp. 1-3 (2019).
"Multiprotocol Label Switching," https://en.wikipedia.org/wiki/multiprotocol_label_switching, pp. 1-7 (Dec. 6, 2019).
"Netflow," Wikipedia, https://en.wikipedia.org/wiki/NetFlow, pp. 1-9 (Dec. 3, 2019).
"NetFlow Collector," Kentipedia, Kentik, pp. 1-4 (Sep. 17, 2019).
Petryschuk, "NetFlow Basics: An Introduction to Monitoring Network Traffic," Auvik, https://www.auvik.com/, pp. 1-8 (Mar. 19, 2019).
"Automatic versus Manual NetFlow Deduplication," Noction, https://www.noction.com/blog/automatic-manual-netflow-deduplication, pp. 1-7 (Feb. 1, 2019).
Paul, Santanu, "Network Visibility System with Integrated Netflow Over Syslog Reporting Capability" The IP.com Journal, pp. 1-7 (Jan. 28, 2019).
Leskiw,, "Understanding Syslog: Servers, Messages & Security," https://www.networkmanagementsoftware.com/what-is-syslog/, pp. 1-7 (Oct. 2018).
McGillicuddy, "Next-Generation Network Packet Brokers: Defining the Future of Network Visibility Fabrics," Enterprise Management Associates (EMA) Research, Niagara Networks, pp. 1-27 (Aug. 2018).
Evans, David, "Network Packet Broker with Dynamic Filter Rules," The IP.com Journal, pp. 1-8 (Jun. 2018).
"Principles of Chaos Engineering," https://principlesofchaos.org/?lang=ENcontent, pp. 1-3 (May 2018).
"Network Visibility Network Packet Broker Comparison Table," Ixia, pp. 1-10 (2017).
Michael, "NetFlow Deduplication or Flow Deduplication," Pixer, pp. 1-5 (Dec. 3, 2016).
"Feature Brief: FlowVUE Application," Gigamon, pp. 1-3 (2016).

(56) References Cited

OTHER PUBLICATIONS

"CPacket Radically Simplifies How Data Center and Cloud Professionals Pinpoint Problems," BusinessWire, pp. 1-3 (Jan. 28, 2013).

Hale, "Netflow V9 Datagram Knowledge Series: Part 2—Netflow V9 Packet Header," Geek Speak, pp. 1-3 (Sep. 7, 2012).

"Understanding Flow and Packet Deduplication," Riverbed Technology, pp. 1-5 (2012).

"NetFlow Version 9 Flow-Record Format," Cisco Systems, pp. 1-12 (May 2011).

Non-Final Office Action for U.S. Appl. No. 16/103,598 (dated May 11, 2020).

Non-Final Office Action for U.S. Appl. No. 16/781,542 (dated Sep. 25, 2020).

Non-Final Office Action for U.S. Appl. No. 15/980,699 (dated Sep. 22, 2020).

Sanchez, "Extended Bpf and Data Plane Extensibility: An overview of networking and Linux," PLUMgrid, pp. 1-37 (2014).

Advisory Action and AFCP 2.0 Decision for U.S. Appl. No. 15/608,369 (dated Jul. 1, 2020).

Advisory Action and AFCP 2.0 Decision for U.S. Appl. No. 15/980,699 (dated Jun. 30, 2020).

Notice of Allowance and Fee(s) Due for U.S. Appl. No. 15/608,369 (dated Aug. 19, 2020).

\* cited by examiner

MONITORING ENCRYPTED NETWORK TRAFFIC FLOWS IN A VIRTUAL ENVIRONMENT USING DYNAMIC SESSION KEY ACQUISITION TECHNIQUES

PRIORITY CLAIM

This application claims the benefit of U.S. Provisional Patent Application No. 62/550,558, filed Aug. 25, 2017, the disclosure of which is incorporated herein by reference in its entirety.

TECHNICAL FIELD

The subject matter described herein relates to passive monitoring of network traffic communications in a virtual environment. More specifically, the subject matter relates to monitoring encrypted network traffic flows in a virtual environment using dynamic session key acquisition techniques.

BACKGROUND

The monitoring and processing of secure sockets layer (SSL) traffic is a computationally expensive task that places a large burden on a virtual network's resources. Many network visibility tools handle SSL traffic (e.g., SSL records communicated via packets) by acting as a Man-In-The-Middle (MITM) entity, thereby decrypting and re-encrypting received SSL traffic while extracting a clear-text copy for associated network monitoring tools. In a typical virtual SSL proxy architecture, a client device or instance is configured to negotiate an encrypted connection for a secure session (e.g., SSL session) between itself and an SSL proxy instance. Likewise, a destination server instance and the SSL proxy instance subsequently negotiate a second encrypted connection in order to conduct a secure session between the destination server instance and the SSL proxy instance. Since the SSL proxy instance must decrypt and re-encrypt all network traffic (e.g., record traffic or packet traffic) before the traffic can be forwarded to the intended recipient, this method (often referred to as active SSL inspection or full SSL inspection) can introduce severe performance bottlenecks on the processing of live network traffic. More specifically, active SSL inspection methods frequently used today involve terminating the SSL connection at a MITM point, decrypting the encrypted traffic data, creating a copy of clear text data to be sent to the out-of-band analysis tool(s), and then re-encrypting the connection prior to sending the encrypted network traffic to its intended destination server.

Accordingly, a need exists for methods, systems, and computer readable media for monitoring encrypted network traffic flows in a virtual environment using dynamic session key acquisition techniques.

SUMMARY

Methods, systems, and computer readable for monitoring encrypted network traffic flows in a virtual environment using dynamic session key acquisition techniques are disclosed. According to one method executed by a dynamic session key acquisition (DSKA) engine residing in a virtual environment, the method includes receiving session decryption information extraction instructions that configure the DSKA engine to obtain session decryption information for at least one communication session involving a virtual machine and obtaining the session decryption information from the virtual machine in accordance with the session decryption information extraction instructions, wherein the session decryption information includes cryptographic keys utilized by an application server instance in the virtual machine to establish the at least one communication session. The method further includes storing the session decryption information obtained from the virtual machine and providing the session decryption information to a network traffic monitoring (NTM) agent, wherein the NTM agent utilizes the session decryption information to decrypt copies of encrypted network traffic flows belonging to the at least one communication session involving the virtual machine.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary non-transitory computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors, network interfaces, and memory.

As used herein, each of the terms 'engine' and 'agent' refers to virtual components that are supported by underlying hardware and software for implementing the feature(s) being described.

As used herein, the term "packet" refers to a network packet or any formatted unit of data capable of being transmitted in a computer network, such as protocol data unit, a frame, a datagram, a user datagram protocol packet, a transport control protocol packet, an SSL record, a TLS record, or the like.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for monitoring encrypted network traffic flows in a virtual environment using dynamic session key acquisition techniques. In some embodiments, the disclosed subject matter includes a dynamic session key acquisition (DSKA) engine that is configured to communicate with network traffic monitoring (NTM) agent (e.g., a an SSL-aware network packet broker (NPB) element) and monitor communications in a virtual environment. In some examples, the NTM agent may comprise an extended Berkeley packet filter (eBPF)-based key acquisition mechanism that is configured to passively obtain SDI information without active involvement (e.g., proxy functionality) of an SSL key server instance. Specifically, the DSKA engine may be configured to detect per-session cryptographic key information session decryption information contained in packets or records communicated between a virtual SSL server instance and a virtual application server instance. Such per-session cryptographic key information (e.g., public and private pair key information) may be referred to herein as session decryption information (SDI). Alternatively, the DSKA engine may directly obtain session decryption information from the virtual SSL server instance (e.g., its local key store). Once obtained, the session decryption information may be provided to the NTM agent by the DSKA engine via a virtual tap interface. In some embodiments, the session decryption information associated with SSL sessions monitored by the DSKA system is sent via a secure communications tunnel (e.g., an IPsec tunnel) that is established between the NTM agent and a virtual tap instance. The NTM agent may then use the session decryption information to inspect copies of encrypted packets and perform a number of NPB functions, such as filtering, sampling, de-duplication, and data masking, at a much higher throughput rate than a network element that implements active SSL decrypt/encrypt inspection.

In some instances, the disclosed subject matter describes the encryption and decryption of packets as part of the monitoring of network traffic flows. Although the disclosed subject matter pertains largely to the encryption and decryption of SSL-based datagrams or records (which may be communicated via one or more packets), it is understood by persons skilled in the art of SSL communications that any description below of the encryption and decryption of packets corresponding to a monitored network traffic flow can involve the encryption and decryption of SSL-based records. In some embodiments, a record is a logical portioning at SSL level (above layer 4) and may span (i.e., be included in part via) multiple packets.

Embodiments of the disclosed subject matter illustrate exemplary deployments in the context of SSL communications. It will be appreciated that other embodiments of the disclosed subject matter can be deployed in a generally similar manner to provide the monitoring functionality in a transport layer security (TLS)-based or an IPsec-based encryption environment.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
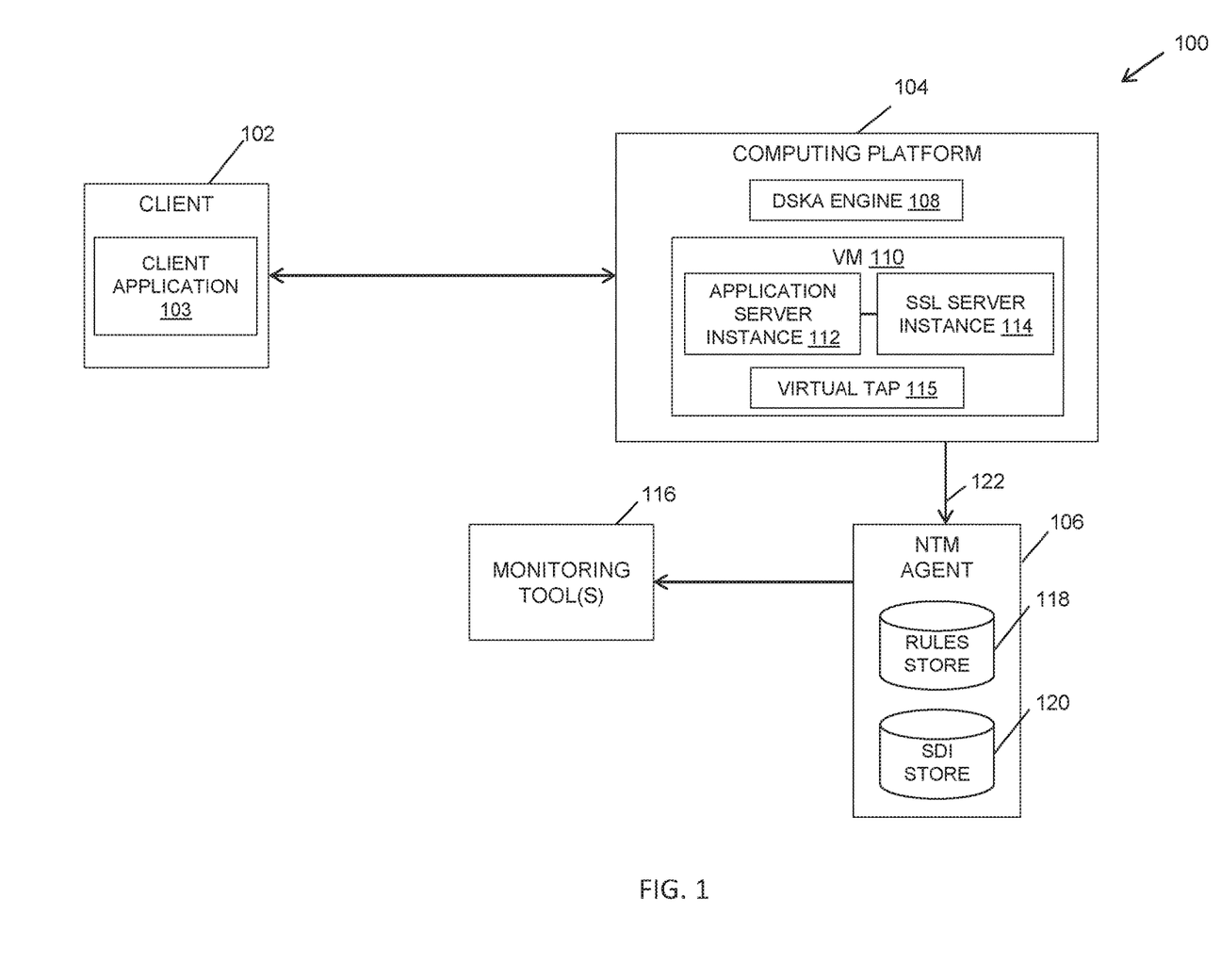
FIG. 1 is a block diagram illustrating a dynamic session key acquisition system that is configured to monitor encrypted network traffic flows in a virtual environment using dynamic session key acquisition techniques according to an embodiment of the subject matter described herein.

FIG. 1 depicts a logical block diagram of one exemplary DSKA-based monitoring system that is described herein. As shown in FIG. 1, a network environment 100 includes at least one client device 102 that hosts a client application 103 (e.g., a web browser application). Client device 102 may comprise a user endpoint device, such as a smartphone, personal computer, laptop computer, Internet of things (IoT) device, or any other device that is configured to host and support client application 103. Alternatively, client device 102 may comprise a client instance that runs on a virtual machine hosted within a cloud-computing environment.

Figure 2:
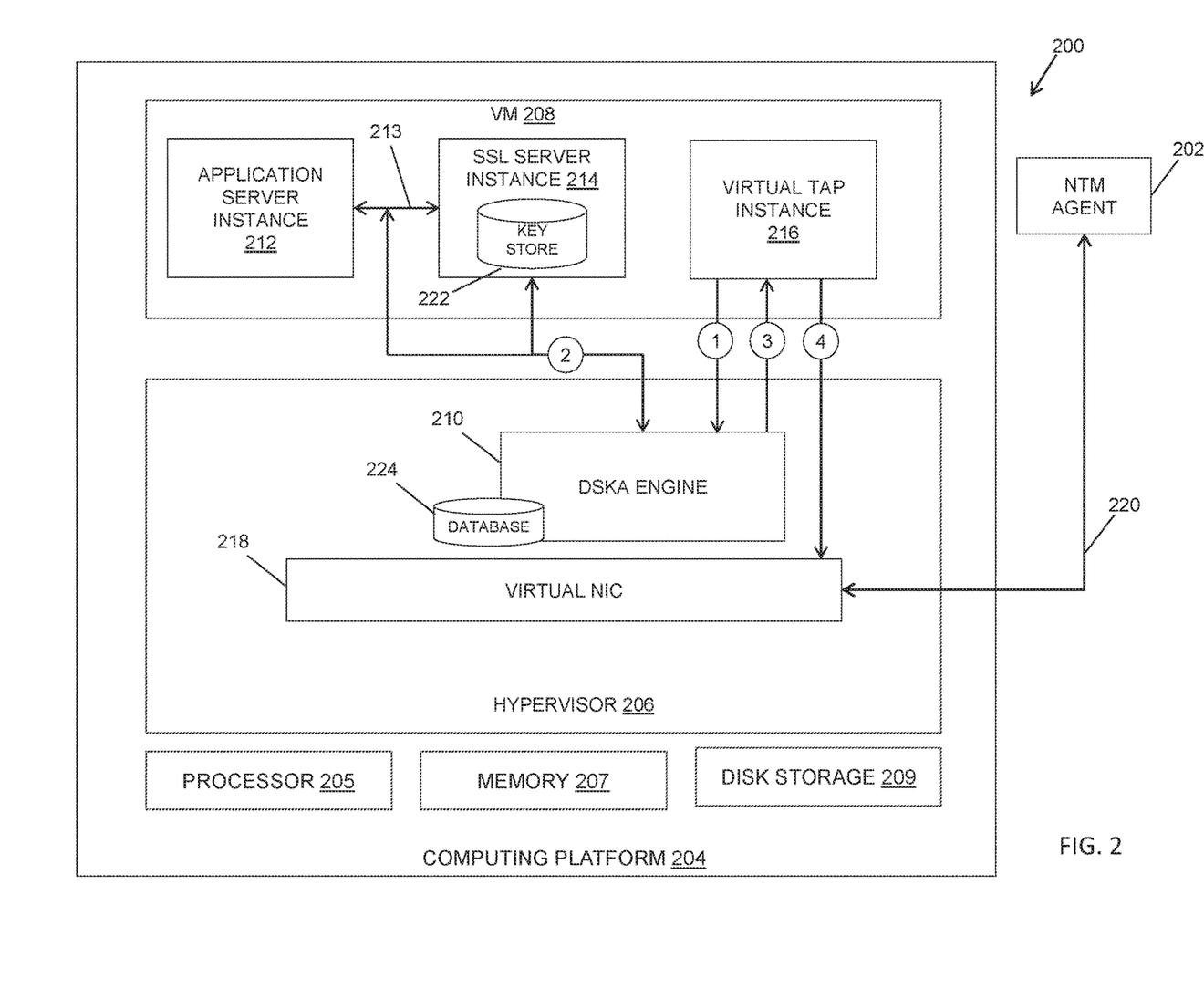
FIG. 2 is a block diagram illustrating a decryption session key acquisition system included in a virtual environment according to an embodiment of the subject matter described herein.

Network environment 100 may further include a computing platform 104 and an NTM agent 106. Computing platform 104 can comprise a DSKA engine 108 that is configured to communicate with virtual machine (VM) 110, which hosts an application server instance 112 and an SSL server instance 114. For example, each of application server instance 112 and SSL server instance 114 may comprise a virtual instance running on a virtual machine container hosted within a cloud-computing environment. In some embodiments, SSL server instance 114 may provide SSL service support for application server instance 112. For example, SSL server instance 114 may be configured to establish an SSL communication session with client device 102 in response to application server instance 112 receiving secure session requests (from client application 103). In some embodiments, the monitored communication session between client device 102 and an application server instance 112 may be established using a per-session encryption technique, such as elliptic curve Diffie-Hellman ephemeral (ECDHE). In other embodiments (not shown), the SSL server instance 114 and application server instance 112 may constitute the same entity (i.e., the application server is capable of conducting its own SSL key generation for a session with client application 103).

In some embodiments, SSL server instance 114 can be configured for creating, distributing, and storing session decryption information (e.g., ephemeral cryptographic security keys and associated session identification information) for communication sessions traversing a monitored network environment. For example, as used herein, session decryption information may include at least private and public cryptographic key pair information that is associated with a monitored session. In some embodiments, SSL server instance 114 is responsible for generating the cryptographic public and private key pairs for a monitored application server instance 112 that is establishing an SSL session with a requesting client application 103 and/or client device 102.

In one exemplary scenario, client application 103 may initiate an SSL session with application server instance 112. In such a scenario, application server instance 112 may send a message to SSL server instance 114 to request that session decryption information (e.g., public and private key pair data) for the client requested session be generated and stored by SSL server instance 114. In some embodiments, the generated session decryption information may include ECDHE cryptographic security keys (e.g., public and private key pair data). SSL server instance 114 may maintain a key store (not shown in FIG. 1) that is configured to store data that identifies monitored communication sessions (e.g., a session involving the application server instance 112) as well as the session decryption information corresponding to the monitored communication session. For example, SSL server instance 114 may include a key store database that contains entries that map public key and private key pairs to one or more monitored session identifiers. Exemplary session identifiers may include a client application identifier, a client device identifier, a monitored application identifier, a monitored application server identifier, a VLAN identifier, or a SSL-based identifier.

In some embodiments, DSKA engine 108 may be configured to the acquire session decryption information from the SSL server instance 114 that is hosted locally by virtual machine 110. As described in greater detail below and in FIG. 2, DSKA engine 108 may be adapted to monitor the communication sessions conducted between SSL server instance 114 and application server instance 112 and extract session decryption information contained within (e.g., using a hook function). Alternatively, DSKA engine 108 may be configured to obtain the session decryption information, via direct access, from the aforementioned key store. After obtaining the session decryption information, DSKA engine 108 can forward that information to NTM agent 106.

In some embodiments, NTM agent 106 comprises an SSL-aware network packet broker (NPB) device configured to monitor network traffic flow records (e.g., packets or records communicated between client device 102 and application server instance 112) in a passive manner. NTM agent 106 may also be configured to maintain a list of sessions that have been designated to be monitored. In some embodiments, a network operator may provision NTM agent 106 with session identifiers that indicate specific applications and/or sessions that require monitoring or surveillance. For example, a session list may include a number of entries, wherein each of the entries includes at least one session identifier, such as a client application identifier, a client device identifier, a monitored application identifier, a monitored application device identifier, a VLAN identifier, and/or an SSL-based identifier (e.g., a public cryptographic key value). Notably, the session list maintained by NTM agent 106 includes session identifiers that correspond to one or more of the session identifiers included in a key store database managed by SSL server instance 114 (as described below in FIG. 2).

In some embodiments, NTM agent 106 may be configured to receive copies of encrypted network traffic flows communicated between client device 102 and application server instance 112 (or a monitored application server) in computing platform 104. In some embodiments, NTM agent 106 may be connected (e.g., via a virtual network interface card as shown in FIG. 2) to one or more virtual tap (or probe) instances in computing platform 104 that are configured to identify and copy packets/records of specified network traffic flows. After identifying an encrypted packet or record associated with a network traffic flow that has been designated for monitoring, virtual tap instance 115 is configured to create a copy of the packet or record and forward the encrypted copies to NTM agent 106 via a secure interface connection 122. Similarly, the originally received packet or record (from which the copy was made) is forwarded to its intended destination by virtual tap instances 115. For example, NTM agent 106 can receive (from virtual tap instance 115) copies of encrypted network traffic flows that are communicated to/from virtual machine 110. Further, NTM agent 106 may be configured to inspect these network traffic flows communicated over sessions that have been designated for monitoring. In some embodiments, NTM agent 106 may also be provisioned with sufficient storage (or granted access to sufficient non-local storage) to store the copies of encrypted records and/or packets of the monitored sessions.

As indicated above, NTM agent 106 is further configured to establish a secure interface connection 122 with computing platform 104. In some embodiments, secure interface connection 122 is established as a separate and dedicated SSL session or an IPsec tunnel between NTM agent 106 and computing platform 104. Once established, secure interface connection 122 may be used by NTM agent 106 to receive session decryption information (e.g., public and private cryptographic key pair information) for a session originally requested by client device 102. In some embodiments, DSKA engine 108 may be configured to distribute the session decryption information obtained from server instance(s) in virtual machine 110 by automatically forwarding the collected session decryption information (e.g., private and public cryptographic key information and session identification information) to one or more subscribed/designated NTM agents (e.g., NTM agent 106) at or near the time when the public and private cryptographic key pairs are created. As previously indicated, DSKA engine 108 is configured to maintain an authorization list of encryption-aware NTM agents that are authorized or subscribed to receive session decryption information related to a monitored session. Specifically, NTM agents (e.g., NTM agent 106) included in the authorization list maintained by DSKA engine 108 are designated to receive the session decryption information in real-time (e.g., as the session decryption information is generated) or in accordance with a session decryption information provisioning schedule established by a network operator. For example, DSKA engine 108 may attempt to provide public and private key pair information to each subscribed NTM agent or device via separate secure interface connections (e.g., similar to secure interface connection 122) as soon as the public and private key information is generated and/or stored by SSL server instance 114.

After NTM agent 106 receives the session decryption information from DSKA engine 108 via virtual tap instance 115 and secure interface connection 122, NTM agent 106 may decrypt the packets and/or records of the copied encrypted traffic flow(s). In some embodiments, NTM agent 106 may receive a copy of encrypted traffic flow(s) from virtual tap instance 115. Notably, NTM agent 106 is configured to decrypt the copies of the obtained encrypted records using the session decryption information received from SSL server instance 114.

NTM agent 106 may then inspect the network traffic flow records and/or packets decrypted with the session decryption information (i.e., private key value) and perform NPB functions (e.g., filtering, sampling, de-duplication, and/or data masking) on the decrypted network traffic flow records and/or packets. For example, after the encrypted network traffic flow packets and/or records are decrypted by NTM agent 106 using the session decryption information provided by DSKA engine 108, the decrypted packets/records are subsequently processed by one or more packet broker filtering rules and/or sampling rules provisioned in NTM agent 106. In particular, the rules are used by NTM agent 106 to determine which packets and/or records are to be forwarded to one or more out-of-band network tools 116 (e.g., via NPB tool ports). NTM agent 106 may also apply processing operations that modify the packets/records or the associated network traffic flow (e.g., replication, de-duplication, data masking, etc.) prior to forwarding packets/records to the appropriate out-of-band network tools 116 (e.g., via the NPB tool ports). Notably, NPB functions performed by NTM agent 106 are conducted at a greater throughput rate as compared to a MITM network element that implements active SSL decrypt/encrypt inspection. After assessing and determining the proper network tool destinations, NTM agent 106 forwards the decrypted session records and/or flow metadata accordingly.

It will be appreciated that FIG. 1 is for illustrative purposes and that various depicted entities, their locations, and/or their functions described above in relation to FIG. 1 may be changed, altered, added, or removed without departing from the scope of the disclosed subject matter.

FIG. 2 depicts is a block diagram illustrating a dynamic session key acquisition system existing in a network environment 200 according to an embodiment of the subject matter described herein. As shown in FIG. 2, network environment 200 may comprise a physical computing platform 204 that supports a hypervisor 206 and at least one virtual machine 208. Computing platform 204 may also include underlying hardware components that support hypervisor 206 and virtual machine 208. For example, computer platform 204 may include a processor 205, memory 207, disk storage 209, a network interface card (not shown), and the like. Processor 205 may comprise a central processing unit (CPU), a microcontroller, or any other physical processing device for executing software instructions stored in memory 207. Memory 207 may comprise any suitable non-transitory storage medium that resides on a physical computing host device, such as random-access memory (RAM), flash memory, and the like. Disk storage 209 can include any physical storage unit configured to storing data on computing platform 204, such as a hard disk drive (HDD) or array, a solid state drive (SSD) or array, a portable flash drive, and the like.

As indicated above, computing platform 204 may include a hypervisor 206 and at least one virtual machine 208. Hypervisor 206 may either be a Type 1 hypervisor (e.g., a bare metal hypervisor) or a Type 2 hypervisor (e.g., a kernel-based VM hypervisor). In some examples, hypervisor 206 is a software program that enables multiple guest operating systems to share the physical resources of a single hardware host, i.e., computing platform 204. Notably, hypervisor 206 coordinates the assignment and allocation of hardware resources to establish tenant virtual machines. Further, hypervisor 206 may be responsible for establishing and managing one or machines (e.g., creating, deleting, migrating, restarting, and/or stopping virtual machines). For example, hypervisor 206 may allocate and/or emulate physical resources to establish and support virtual machine 208. Hypervisor 206 may create virtual machine environments and coordinate system calls for the processor, memory, hard disk, network, and other physical platform resources directly (e.g., Type 1 hypervisor) or via the computing platform operating system (e.g., Type 2 hypervisor). In some examples, hypervisor 206 may be configured to receive commands from a hypervisor controller (not shown) or some other entity that instructs hypervisor 206 as to how to manage and/or configure virtual machine 208.

Hypervisor 206 may be configured to support a DSKA engine 210 and an associated virtual network interface card 218. Notably, virtual network interface card 218 can be supported by an underlying physical hardware network interface card (not shown) installed on computing platform 204. In some embodiments, DSKA engine 210 may comprise a packet filter element (e.g., an enhanced Berkeley packet filter) that is used to manage the extraction of session decryption information communicated and/or utilized by server instances supported in virtual machine 208. DSKA engine 210 may also include a local database 224 that is configured to store session decryption information that the DSKA engine 210 has collected from virtual machine 208 (e.g., directly from key store 222 or from communication session 213). Local database 224 may also be used by DSKA engine 210 to maintain identification records of network traffic monitoring (NTM) agents that are subscribed to receive session decryption information. For example, DSKA engine 210 may be configured to maintain a log in database 224 of NTM agents that are configured to monitor a particular session and provide the session decryption information to the appropriate NTM agents.

Network environment 200 may further include a NTM agent 202. Although depicted in FIG. 2 as a separate network element located in network environment 200, NTM agent 202 may instead be hosted in virtual machine 208 or another virtual machine local to computing platform 204. Alternatively, NTM agent 202 may be supported by a separate virtual machine or application that resides on a different physical computing host device (not shown).

In some embodiments, DSKA engine 210 may be configured to receive session decryption information extraction instructions (e.g., from a network operator) via a virtual tap instance 216 or NTM agent 202. In some embodiments, DSKA engine 210 is initially provisioned with instructions or code by a network operator. For example, the extraction instructions or code may be delivered to DSKA engine 210 directly from virtual tap instance 216 or from NTM agent 202, via a secure connection 220, a virtual network interface card 218, and virtual tap instance 216. In such a scenario, virtual tap instance 216 or NTM agent 202 passes instructions to DSKA engine 210 that instruct the DSKA engine 210 to monitor for and obtain session decryption information communicated in network traffic sessions associated with particular virtual application server instance. For example, the extraction instructions may include a session identifier associated with the monitored application server instance 212.

As shown in FIG. 2, virtual tap instance 216 may comprise a virtual instance of a software-based monitoring agent application that is used to observe and generate copies of encrypted network traffic flow records and/or packets associated with a monitored session between a client (not shown) and monitored application server instance 212. In some embodiments, the records and/or packets are encrypted for communication between the client and application server instance 212 using ECDHE, or some other per-session, public and private cryptographic key encryption technique. Virtual tap instance 216 is interposed in virtual machine 208 so as to passively create encrypted copies of monitored record and/or packets associated with a secure communication session between the client and application server instance 212. The copied network traffic flow records and/or packets are relayed and/or forwarded by virtual tap instance 216 to NTM agent 202. Notably, the copied network traffic flow records and/or packets received by NTM agent 202 retain their original encryption. Further, virtual tap instance 216 may be deployed as a virtualized element in a cloud computing virtual environment, so as to be embodied by a virtual machine or virtual computing cluster. In some embodiments, a virtual tap instance 216 may be deployed in tandem with a virtual application server instance (e.g., application server instance 212) that is to be monitored, such that virtual tap instance 216 is capable of observing and passively creating copies of monitored network traffic flow records or packets associated with a secure communication session between a monitored client and application server instance 212. The copied monitored network traffic flow records and/or packets retain their original encryption and are relayed or forwarded to NTM agent 202 via virtual network interface card 218 and secure connection 220.

After receiving the session decryption information extraction instructions from either virtual tap instance 216 or NTM agent 202, DSKA engine 210 may attempt to obtain and record the requested session decryption information using a plurality of techniques. Notably, the manner in which DSKA engine 210 obtains the requested session decryption information may be based on its own local configuration or in accordance with a protocol designation included in the session decryption information extraction instructions itself. For example, the DSKA engine 210 may be configured to observe network traffic flow communications between the monitored application server instance 212 and SSL server instance 214 in virtual machine 208.

SSL server instance 214 may be configured to create, distribute, and store session-specific cryptographic key pairs that can be used to encrypt and decrypt SSL records and/or packets associated with a monitored SSL session. Monitored application server instance 212 is configured to communicate with SSL server instance 214 to obtain security key information corresponding to one or more communication sessions with a requesting client application and/or device. Specifically, SSL server instance 214 is configured to provide SSL services to a monitored application server instance 212, which is being monitored by the monitoring system (i.e., NTM agent 202, DSKA engine 210, and/or and virtual tap instance 216). For example, SSL server instance 214 can generate and store per-session private and public key information on behalf of a monitored application hosted by application server instance 212. Further, SSL server instance 214 may use database 224 to store session decrypt information that identifies the session (e.g., a session identifier, session identifier tuple, etc.), includes a public key value to be used by the application server instance 212 for establishing a secure session with a client instance or device (not shown), and includes a private key value to be used by application server instance 212 in establishing a secure session with the client instance or device.

In some embodiments, monitored application server instance 212 may receive a session request from a client (not shown) and be configured to establish an SSL session to securely communicate data via records or packets with the client. In such a scenario, SSL server instance 214 may be configured to generate and make available a public and private cryptographic key pair to monitored application server instance 212. For example, in instances where SSL server instance 214 and monitored application server instance 212 are the same entity (e.g., the same server), then SSL server instance 214 may communicate the public cryptographic key to the client and provide (e.g., "push") session decryption information including the cryptographic key pair to one or more registered NTM agents, such as NTM agent 202.

In some embodiments, DSKA engine 210 may execute a hook function that accesses and inspects the packets or records that are communicated in the network traffic flow between application server instance 212 and SSL server instance 214 (as described below). Although monitored application server instance 212 and SSL server instance 214 are shown to reside on the same virtual machine in FIG. 2, the two server instances may reside on separate virtual machines hosted by computing platform 204 without departing from the scope of the disclosed subject matter.

In other embodiments, DSKA engine 210 may be configured to directly access and inspect session decryption information that is stored in key store 222 of SSL server instance 214. Key store 222 may be used by SSL server instance 214 may store all of the session decryption information corresponding to SSL sessions (with various application server instances) established by SSL server instance 214. Specifically, key store 222 may contain entries that include session identification data that identifies, or can be used to identify, a communications session between the monitored client and the monitored application server, as well as the public and private cryptographic keys associated with that session.

In some embodiments, DSKA engine 210 may utilize a query function that sends a request message to SSL server instance 214 and requests the corresponding session decryption information stored in key store 222. In some embodiments, DSKA engine 210 is able to execute a query function to directly access and view the key store 222 residing in SSL server instance 214. For example, DSKA engine 210 provides a session identifier that is included in the request message sent to key store 222 that identifies the session being monitored. In response to receiving such a request message from DSKA engine 210, SSL server instance 214 may forward the session decryption information corresponding to the provided session identifier to DSKA engine 210. In other embodiments, DSKA engine 210 may execute a hook function to directly access the key store 222 and extract the appropriate session decryption information per the extraction instructions (which contains the session identifier).

In some examples, DSKA engine 210 may be configured to monitor a communication session 213 established between application server instance 212 and SSL server instance 214. In some embodiments, communications session 213 may be implemented via an application programming interface (API). Notably, DSKA engine 210 can be configured by the received extraction instructions to inspect session 213 for communicated session decryption information. For instance, DSKA engine 210 may utilize a hook function to intercept packets or records that include a particular session identifier during transmission between the SSL server instance 214 and any application server instance (e.g., application server instance 212). Session identifiers utilized by DSKA engine 210 may include one or more of a destination address, a destination port number, an origination address, an origination port, and the like. Other session identifiers utilized by DSKA engine 210 may also include SSL based information, such as a public key pair value. In the event that DSKA engine 210 detects a defined session identifier in a packet or record communicated in session 213, DSKA engine 210 may copy that packet or record. DSKA engine 210 may subsequently extract and store the session decryption information contained in the copied packet or record in a database 224.

DSKA engine 210 is configured to create and maintain database 224, which may comprise any data structure that includes session decryption information that is observed in the communication session 213 between application server instance 212 and SSL server instance 214. Database 224 may also be used to store session decryption information extracted directly from key store 222. After successfully storing the session decryption information acquired from the server instance(s) hosted in virtual machine 208, DSKA engine 210 may be configured to forward the session decryption information to virtual tap instance 216. Fore example, DSKA engine 210 may generate and forward a report containing the session decryption information to virtual tap instance 216. Alternatively, database 224 may be accessed directly by virtual tap instance 216, which subsequently extracts the session decryption information.

After obtaining the session decryption information from the DSKA engine 210, virtual tap instance 216 is configured to relay or forward the session decryption information to NTM agent 202. In some embodiments, virtual tap instance 216 forwards the session decryption information to a virtual network interface card 218, which in turn directs the session decryption information to NTM agent 202 via a secure connection 220. For example, DSKA engine 210 may be configured to automatically send the session decryption information to NTM agent 202 at the time that the session decryption is obtained by DSKA engine 210. NTM agent 202 is configured to store the session decryption information acquired from DSKA engine 210 (via virtual tap instance 216) and to subsequently use this session decryption information to decrypt copies of monitored network traffic flow records (and/or packets) associated with the session, wherein the record copies are provided by the virtual tap instance 216 (or monitoring probes). In this manner, NTM agent 202 is configured to monitor, decrypt and inspect secure session traffic flow records in network environment 200, while avoiding the processing bottleneck(s) associated with prior active SSL monitoring/decryption approaches.

NTM agent 202 may subsequently inspect the network traffic flow records and/or packets decrypted with the session decryption information (i.e., private key value) and perform NPB functions (e.g., filtering, sampling, de-duplication, and/or data masking) on the decrypted network traffic flow records and/or packets. Similar to the manner described above with respect to FIG. 1, decrypted packets/records may be subsequently processed by one or more packet broker filtering rules and/or sampling rules provisioned in NTM agent 202. Namely, the rules are used by NTM agent 202 to determine which packets and/or records are to be forwarded to one or more out-of-band network tools (not shown in FIG. 2).

Figure 3:
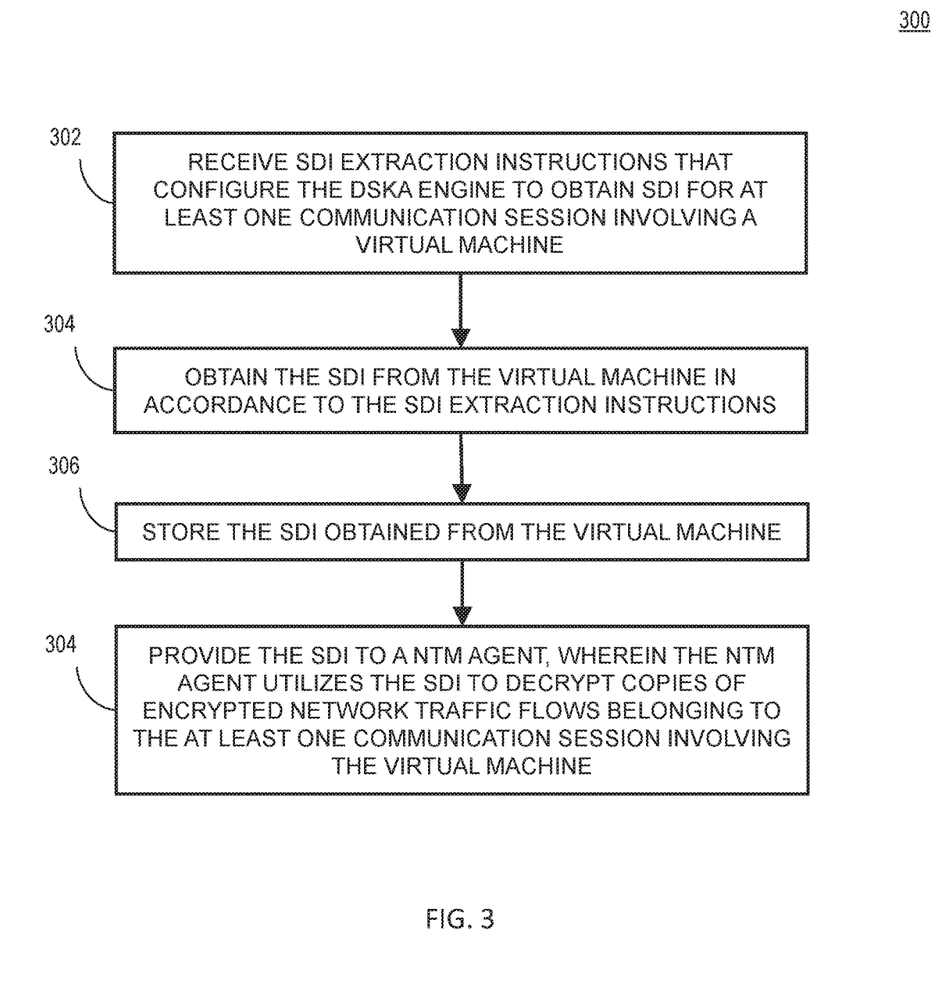
FIG. 3 is flowchart illustrating a process for monitoring encrypted network traffic flows in a virtual environment using dynamic session key acquisition techniques according to an embodiment of the subject matter described herein.

FIG. 3 is flowchart illustrating a process for monitoring encrypted network traffic flows in a virtual environment using dynamic session key acquisition techniques according to an embodiment of the subject matter described herein. In some embodiments, process 300, or portions thereof, may be performed by DSKA engine 108 and NTM agent 106 shown in FIG. 1 and/or DSKA engine 210 and NTM agent 202 shown in FIG. 2. In some embodiments, process 300 may include an algorithm comprising steps 302, 304, 306, and/or 308 that is stored in memory and executed by a processor (e.g., a CPU of computing platform 104 or 204).

In step 302, session decryption information extraction instructions that configure the DSKA engine to obtain session decryption information for at least one communication session involving a virtual machine are received. In some embodiments, one or more monitoring taps or an NTM agent is configured to upload session decryption information extraction instruction code to the DSKA engine.

In step 304, the session decryption information from the virtual machine is obtained in accordance with the session decryption information extraction instructions. For example, the session decryption information includes cryptographic keys utilized by an application server instance in the virtual machine to establish the at least one communication session. In some embodiments, DSKA engine obtains session decryption information directly from a key store associated with a SSL server instance executed by the virtual machine. In other embodiments, the DSKA engine monitors a communication session between a monitored application server instance and the SSL server instance. Notably, the DSKA engine may utilize a hook function that attempts to identify packets or records containing a session identifier Indicated in the previously received session decryption information extraction instructions.

In step 306, the session decryption information obtained from the virtual machine is stored. In some examples, the DSKA engine is configured to store the session decryption information obtained either directly from the SSL server key store or from the monitored communication session between the SSL server and the monitored application server instance. Notably, the DSKA engine stores the acquired session decryption information in local database 224.

In step 308, the session decryption information is provided to a NTM agent. In some embodiments, the NTM agent utilizes the session decryption information to decrypt copies of encrypted network traffic flows belonging to the at least one communication session involving the virtual machine. In addition, the NTM agent utilizes the session decryption information to decrypt copies of encrypted network traffic flows belonging to the at least one communication session involving the virtual machine. For example, the NTM agent may be configured to send the decrypted network traffic flows to at least one packet analyzer or out of band monitoring tool. In some embodiments, the packet analyzer is a virtual entity residing completely within the virtual network environment. In other embodiments, the package analyzer may be a hardware-based packet analyzer that is configured to receive unencrypted network traffic flows from the NTM agent.

It will be appreciated that process 300 is for illustrative purposes and that different and/or additional actions may be used. It will also be appreciated that various actions described herein may occur in a different order or sequence.

It should be noted that each of the DSKA engine, the NTM agent, and/or functionality described herein may constitute a special purpose computing device. Further, the DSKA engine, the NTM agent, and/or functionality described herein can improve the technological field of monitoring encrypted network traffic flows involving monitored devices and applications by implementing a passive inspection mechanism. For example, an NTM agent may be directly provided with public and private keys associated with a particular monitored session. Notably, the NTM agent does not need to decrypt and re-encrypt network traffic communicated involving a monitored device/application. As such, the session-aware NTM agent can inspect and perform NPB functions, such as filtering, sampling, de-duplication and data masking at a much higher throughput rate than a device that implements active SSL decryption.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
by a dynamic session key acquisition (DSKA) engine residing in a virtual environment:
receiving session decryption information extraction instructions that configure the DSKA engine to obtain session decryption information for at least one communication session involving a virtual machine;
obtaining the session decryption information from the virtual machine in accordance with the session decryption information extraction instructions, wherein the session decryption information includes cryptographic keys utilized by an application server instance in the virtual machine to establish the at least one communication session, wherein the session decryption information is obtained by the DSKA engine from communications between a monitored application server instance and a secure sockets layer (SSL) server instance that are hosted by the virtual machine;
storing the session decryption information obtained from the virtual machine;
and providing the session decryption information to a network traffic monitoring (NTM) agent, wherein the NTM agent utilizes the session decryption information to decrypt copies of encrypted network traffic flows belonging to the at least one communication session involving the virtual machine.

2. The method of claim 1 wherein the session decryption information extraction instructions are received by the DSKA engine from a virtual tap instance or the NTM agent.

3. The method of claim 1 wherein obtaining the session decryption information from the virtual machine includes acquiring the session decryption information via a direct access to a secure sockets layer (SSL) server instance hosted by the virtual machine.

4. The method of claim 1 wherein obtaining the session decryption information from the virtual machine includes detecting and storing the session decryption information contained in network traffic flows communicated between an application server instance and a secure sockets layer (SSL) server instance hosted by the virtual machine.

5. The method of claim 1 wherein the NTM agent is a virtual instance hosted by a second virtual machine in the virtual environment.

6. The method of claim 1 wherein the NTM agent is configured to use the session decryption information to decrypt copies of encrypted network traffic flow records to produce decrypted network traffic flow records.

7. The method of claim 1 wherein the DSKA engine is configured to forward the session decryption information to the NTM agent via at least one virtual tap instance and a virtual network interface card.

8. A system comprising:
at least one virtual tap instance residing in a virtual environment configured to capture encrypted network traffic flows belonging to at least one communication session involving an application server instance hosted by a virtual machine, wherein the at least one virtual tap instance is a virtual instance of a software-based monitoring agent application that executed by a hardware processor of a computing platform supporting the virtual environment; and
a dynamic session key acquisition (DSKA) engine residing in the virtual environment configured to receive session decryption information extraction instructions that configure the DSKA engine to obtain session decryption information for at least one communication session involving a virtual machine, to obtain the session decryption information from the virtual machine in accordance with the session decryption information extraction instructions, wherein the session decryption information includes cryptographic keys utilized by the application server instance to establish the at least one communication session, wherein the session decryption information is obtained by the DSKA engine from communications between a monitored application server instance and a secure sockets layer (SSL) server instance that are hosted by the virtual machine, to store the session decryption information obtained from the virtual machine, and to provide the session decryption information to a network traffic monitoring (NTM) agent, wherein the NTM agent utilizes the session decryption information to decrypt copies of encrypted network traffic flows belonging to the at least one communication session involving the virtual machine.

9. The system of claim 8 wherein the session decryption information extraction instructions are received by the DSKA engine from either a virtual tap instance or the NTM agent.

10. The system of claim 8 wherein the DSKA engine is configured to acquire the session decryption information via a direct access to a secure sockets layer (SSL) server instance hosted by the virtual machine.

11. The system of claim 8 wherein the DSKA engine is configured to detect and store the session decryption information contained in network traffic flows communicated between an application server instance and a secure sockets layer (SSL) server instance hosted by the virtual machine.

12. The system of claim 8 wherein the NTM agent is a virtual instance hosted by a second virtual machine in the virtual environment.

13. The system of claim 8 wherein the NTM agent is configured to use the session decryption information to decrypt copies of encrypted network traffic flow records to produce decrypted network traffic flow records.

14. The system of claim 8 wherein the DSKA engine is configured to forward the session decryption information to the NTM agent via at least one virtual tap instance and a virtual network interface card.

15. A non-transitory computer readable medium having stored thereon executable instructions embodied in the computer readable medium that when executed by at least one processor of a computer cause the computer to perform steps comprising:
by a dynamic session key acquisition (DSKA) engine residing in a virtual environment:
receiving session decryption information extraction instructions that configure the DSKA engine to obtain session decryption information for at least one communication session involving a virtual machine;
obtaining the session decryption information from the virtual machine in accordance with the session decryption information extraction instructions, wherein the session decryption information includes cryptographic keys utilized by an application server instance in the virtual machine to establish the at least one communication session, wherein the session decryption information is obtained by the DSKA engine from communications between a monitored application server instance and a secure sockets layer (SSL) server instance that are hosted by the virtual machine;
storing the session decryption information obtained from the virtual machine;
and
providing the session decryption information to a network traffic monitoring (NTM) agent, wherein the NTM agent utilizes the session decryption information to decrypt copies of encrypted network traffic flows belonging to the at least one communication session involving the virtual machine.

16. The non-transitory computer readable medium of claim 15 wherein the session decryption information extraction instructions are received by the DSKA engine from either a virtual tap instance or the NTM agent.

17. The non-transitory computer readable medium of claim 15 wherein obtaining the session decryption information from the virtual machine includes acquiring the session decryption information via a direct access to a secure sockets layer (SSL) server instance hosted by the virtual machine.

18. The non-transitory computer readable medium of claim 15 wherein obtaining the session decryption information from the virtual machine includes detecting and storing the session decryption information contained in network traffic flows communicated between an application server instance and a secure sockets layer (SSL) server instance hosted by the virtual machine.

19. The non-transitory computer readable medium of claim 15 wherein the NTM agent is configured to use the session decryption information to decrypt copies of encrypted network traffic flow records to produce decrypted network traffic flow records.

20. The non-transitory computer readable medium of claim 15 wherein the DSKA engine is configured to forward the session decryption information to the NTM agent via at least one virtual tap instance and a virtual network interface card.

* * * * *